(12) United States Patent
Suzuki et al.

(10) Patent No.: US 11,579,289 B2
(45) Date of Patent: Feb. 14, 2023

(54) DISTANCE MEASURING APPARATUS AND MOBILE BODY INCLUDING THE SAME

(71) Applicant: Ricoh Company, Ltd., Tokyo (JP)

(72) Inventors: Shuichi Suzuki, Osaka (JP); Nobunari Tsukamoto, Osaka (JP); Tsuyoshi Ueno, Kanagawa (JP); Tadashi Nakamura, Kanagawa (JP); Naoto Jikutani, Miyagi (JP); Kazuma Izumiya, Miyagi (JP); Atsushi Sakai, Tokyo (JP); Masayuki Yanagihashi, Kanagawa (JP); Yasufumi Yamada, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 1043 days.

(21) Appl. No.: 16/270,639

(22) Filed: Feb. 8, 2019

(65) Prior Publication Data

US 2019/0250270 A1 Aug. 15, 2019

(30) Foreign Application Priority Data

Feb. 13, 2018 (JP) .............................. JP2018-023420

(51) Int. Cl.
*G01C 3/08* (2006.01)
*G01S 17/10* (2020.01)
(Continued)

(52) U.S. Cl.
CPC .............. *G01S 17/10* (2013.01); *G01S 7/484* (2013.01); *G01S 7/4817* (2013.01); *G02B 5/30* (2013.01);
(Continued)

(58) Field of Classification Search
CPC ...... G01S 17/10; G01S 7/4811; G01S 7/4815; G01S 7/4817; G01S 7/484; G01S 17/931;
(Continued)

(56) References Cited

U.S. PATENT DOCUMENTS 8,988,664 B2 * 3/2015 Suzuki ................. G01S 7/4817
356/3.01
10,222,474 B1 * 3/2019 Raring ................. H01S 5/0087
(Continued)

FOREIGN PATENT DOCUMENTS

CN 107085223 A * 8/2017
CN 107783148 A * 3/2018
(Continued)

*Primary Examiner* — Samantha K Nickerson
(74) *Attorney, Agent, or Firm* — Xsensus LLP

(57) ABSTRACT

A distance measuring apparatus includes a light source to emit light beams, an optical scanner to scan the light beams output from the light source over a predetermined range, a light receiver to receive reflected light obtained as a result of the light beams being reflected by a target object, and to output detection signals, and a control circuit to measure a distance to the target object based on the detection signals. The light source including a plurality of light-emitting device groups that are arranged in a scan direction of a scan performed by the optical scanner, and the control circuit being to make the plurality of light-emitting device groups emit light at respective different timings in a single scan, and to measure the distance to the target object based on a sum of the detection signals.

9 Claims, 9 Drawing Sheets

(51) Int. Cl.
  *G01S 7/481* (2006.01)
  *G01S 7/484* (2006.01)
  *G02B 5/30* (2006.01)
  *G02B 26/08* (2006.01)
  *G02B 26/10* (2006.01)
  *G02B 26/12* (2006.01)

(52) U.S. Cl.
  CPC ........ *G02B 26/0858* (2013.01); *G02B 26/105* (2013.01); *G02B 26/12* (2013.01)

(58) Field of Classification Search
  CPC .... G02B 5/30; G02B 26/0858; G02B 26/105; G02B 26/12; G02B 27/283; F21Y 2115/30; F21S 41/16
  See application file for complete search history.

(56) References Cited

U.S. PATENT DOCUMENTS

| | | | | |
|---|---|---|---|---|
| 2001/0046087 | A1* | 11/2001 | Hoose | G02B 5/1814 359/566 |
| 2010/0108892 | A1* | 5/2010 | Zhang | G01S 17/48 250/353 |
| 2010/0296075 | A1* | 11/2010 | Hinderling | G01S 7/4972 356/3 |
| 2012/0154807 | A1* | 6/2012 | Usami | G01S 7/4811 356/369 |
| 2012/0236290 | A1* | 9/2012 | Eisele | G01S 7/497 356/6 |
| 2013/0120734 | A1 | 5/2013 | Ogata et al. | |
| 2013/0229645 | A1 | 9/2013 | Suzuki et al. | |
| 2014/0009747 | A1* | 1/2014 | Suzuki | G01S 17/02 356/4.01 |
| 2014/0034817 | A1* | 2/2014 | Nakamura | G01S 7/4817 250/221 |
| 2014/0036071 | A1 | 2/2014 | Tadashi et al. | |
| 2014/0071428 | A1 | 3/2014 | Suzuki et al. | |
| 2014/0209793 | A1 | 7/2014 | Nakamura et al. | |
| 2014/0358418 | A1 | 12/2014 | Nakajima et al. | |
| 2015/0029487 | A1 | 1/2015 | Nakajima et al. | |
| 2015/0124238 | A1 | 5/2015 | Sakai et al. | |
| 2015/0160341 | A1 | 6/2015 | Akatsu et al. | |
| 2015/0202939 | A1* | 7/2015 | Stettner | B60G 17/019 701/45 |
| 2015/0204977 | A1* | 7/2015 | Sakai | G01S 17/931 356/4.01 |
| 2015/0268332 | A1 | 9/2015 | Nakamura | |
| 2015/0331108 | A1 | 11/2015 | Itami et al. | |
| 2016/0061955 | A1 | 3/2016 | Imai et al. | |
| 2016/0097843 | A1 | 4/2016 | Nakamura | |
| 2016/0261090 | A1 | 9/2016 | Sakai et al. | |
| 2016/0299219 | A1 | 10/2016 | Suzuki et al. | |
| 2016/0349371 | A1 | 12/2016 | Suzuki et al. | |
| 2017/0082747 | A1 | 3/2017 | Akatsu et al. | |
| 2017/0123063 | A1 | 5/2017 | Yamashita et al. | |
| 2017/0168261 | A1 | 6/2017 | Itami et al. | |
| 2017/0273161 | A1 | 9/2017 | Nakamura | |
| 2018/0038959 | A1 | 2/2018 | Akatsu et al. | |
| 2018/0284270 | A1 | 10/2018 | Sakai et al. | |
| 2020/0233063 | A1* | 7/2020 | Zhang | G01S 7/4808 |

FOREIGN PATENT DOCUMENTS

| | | | | |
|---|---|---|---|---|
| EP | 3128346 | A2 * | 2/2017 | ............ G01S 17/10 |
| JP | 2010-151958 | | 7/2010 | |
| JP | 2014-029317 | | 2/2014 | |
| WO | WO-2017142483 | A2 * | 8/2017 | ............ G01S 17/023 |
| WO | WO-2017145450 | A1 * | 8/2017 | ............ B60W 30/09 |

* cited by examiner

DISTANCE MEASURING APPARATUS AND MOBILE BODY INCLUDING THE SAME

CROSS-REFERENCE TO RELATED APPLICATIONS

This patent application is based on and claims priority pursuant to 35 U.S.C. § 119(a) to Japanese Patent Application No. 2018-023420, filed on Feb. 13, 2018, in the Japan Patent Office, the entire disclosure of which is hereby incorporated by reference herein.

BACKGROUND

Technical Field

The present invention relates to a distance measuring apparatus and a mobile body including the same.

Description of the Related Art

To distinguish cars ahead, obstacles, etc. on the travel road or to detect lane markers, such as lane lines and cat's eyes, indicating lanes, a laser-scanning light detection and ranging (LiDAR) apparatus is used. A LiDAR apparatus is mounted in a vehicle, a vessel, an aircraft, etc., outputs laser beams, and receives reflected light from a detection target to detect an obstacle, etc. present around the mobile body.

As the light source for LiDAR, an edge emitting laser diode that makes light resonate in a direction parallel to the substrate surface and emits the light horizontally from the substrate is generally used. An edge emitting laser has difficulty in integration, and therefore, as the light source, the use of a vertical-cavity surface-emitting laser (VCSEL) that is easily integrated on the same substrate is being reviewed. A VCSEL makes light resonate in a direction perpendicular to the substrate surface and emits the light from the substrate in the vertical direction. A configuration is known in which a plurality of light-emitting points are arranged within a plane orthogonal to the optical axis to form a VCSEL array, and light beams output from the VCSEL array are scanned by a mirror scanner.

SUMMARY

Embodiments of the present disclosure described herein provide a distance measuring apparatus including a light source to emit light beams, an optical scanner to scan the light beams output from the light source over a predetermined range, a light receiver to receive reflected light obtained as a result of the light beams being reflected by a target object, and to output detection signals, and a control circuit to measure a distance to the target object based on the detection signals. The light source including a plurality of light-emitting device groups that are arranged in a scan direction of a scan performed by the optical scanner, and the control circuit being to make the plurality of light-emitting device groups emit light at respective different timings in a single scan, and to measure the distance to the target object based on a sum of the detection signals.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
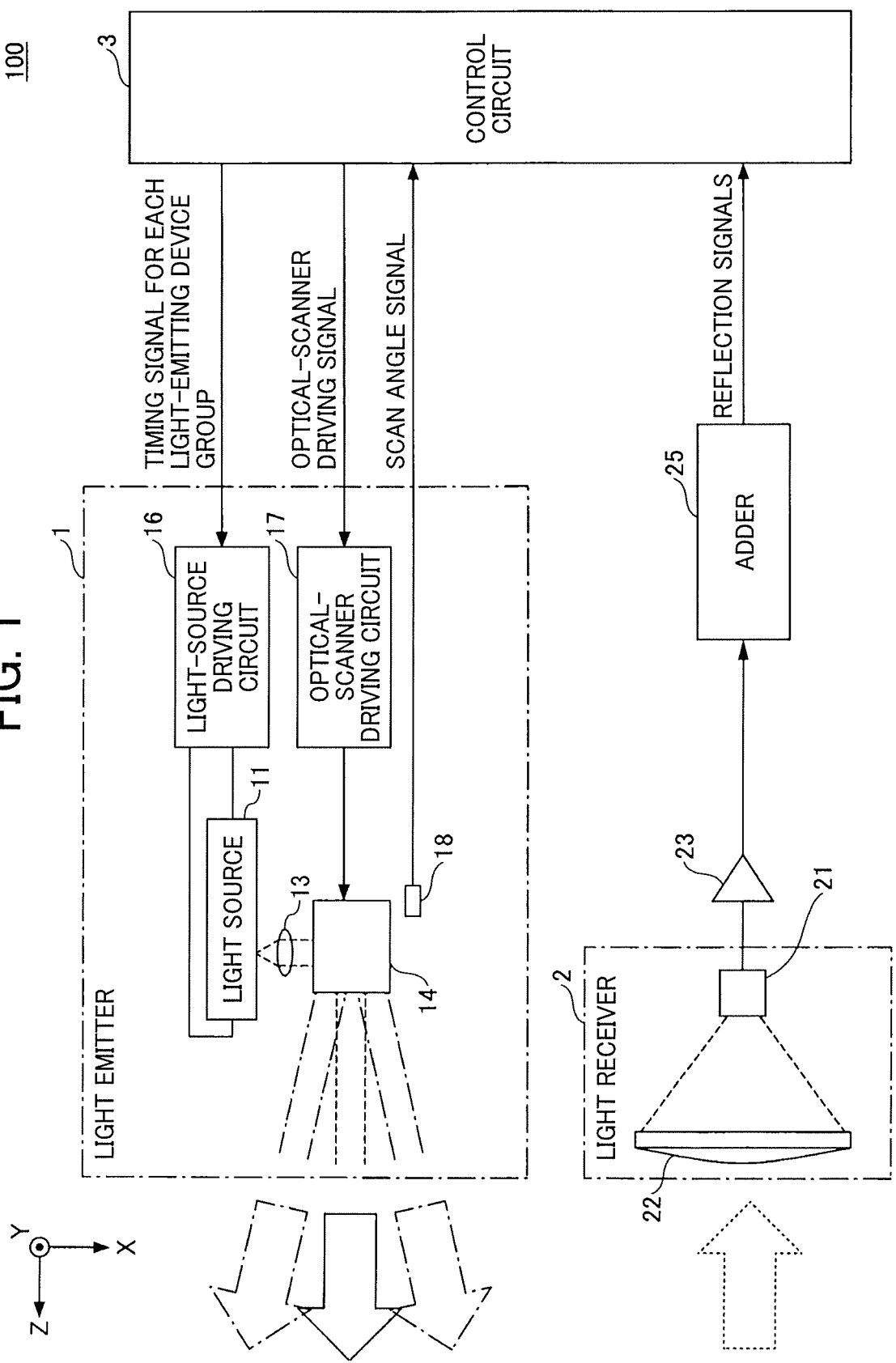
FIG. 1 is a schematic diagram of a LiDAR apparatus used as a distance measuring apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a schematic diagram of a LiDAR apparatus 100, which is a distance measuring apparatus according to an embodiment of the present disclosure.

The LiDAR apparatus 100 includes a light emitter 1 that emits light from a light source, a light receiver 2 that receives reflected light from a target object, an adder 25 that adds up signals output from the light receiver 2 over time, and a control circuit 3 that controls the light emitter 1 and measures a distance on the basis of reflection signals. In FIG. 1, the output of the light receiver 2 is connected to the input of the adder 25, and reflection signals that are added up over time are input to the control circuit 3; however, the adder 25 may be included in the control circuit 3.

The light emitter 1 and the light receiver 2 are generally disposed in a front part of a vehicle so as to detect an object present in front of the vehicle; however, the light emitter 1 and the light receiver 2 can be installed at any location of the vehicle to detect, for example, an object on the side or at the rear of the vehicle.

The light emitter 1 includes a light source 11, a coupling lens 13, an optical scanner 14, a light-source driving circuit 16, an optical-scanner driving circuit 17, and a scan angle monitor 18.

The light source 11 includes a plurality of light-emitting device groups that are disposed in an optical scan direction so as to be spaced apart from each other. Each of the light-emitting device groups is formed of a plurality of VCSELs. The light source 11 is connected to the control circuit 3 via the light-source driving circuit 16, and the control circuit 3 controls the light-emission timings of the light-emitting device groups independently of each other. The configuration and operations of the light source 11 are described in detail below with reference to FIGS. 2A and 2B and the subsequent figures.

The coupling lens 13 couples laser beams emitted from the light source 11 to the optical scanner 14. The optical scanner 14 scans the laser beams, which are output from the plurality of light-emitting device groups of the light source 11, within the XZ plane over the same detection region. With beam deflection given by the optical scanner 14, an object that is present within a predetermined angle range is detected, and the distance to the detected object can be measured.

The optical scanner 14 scans the laser beams over a scan angle, which may be detected by the scan angle monitor 18 and fed to the control circuit 3. In this case, the monitor result is fed back as an optical-scanner driving signal to control the scan angle, the scan frequency, etc.

The light receiver 2 includes a light-receiving device 21 and a light-receiving lens 22. The light-receiving lens 22 couples laser beams reflected from an object present in a beam scan direction to the light-receiving device 21. The light-receiving device 21 is, for example, a photodiode. Between the light-receiving lens 22 and the light-receiving device 21, another optical device, such as a mirror, may be disposed.

The light emitter 1 and the light receiver 2 are disposed close to each other, and the optical axes thereof can be assumed to have a coaxial relationship when the light emitter 1 and the light receiver 2 are viewed from a position about several meters or more distant. Light reflected by a detection target object is scattered in various directions at the reflection point. A light component that returns along an optical path the same as the optical path of laser beams output from the LiDAR apparatus 100 is guided to the light-receiving device 21 via the light-receiving lens 22 and detected as a reflection signal.

The light-receiving device 21 outputs a photocurrent that corresponds to the intensity of input reflected light. The photocurrent output from the light-receiving device 21 is converted to a voltage signal by a transimpedance amplifier not illustrated, and the voltage signal is amplified by an amplifier 23 and input to the adder 25. The adder 25 adds up detection signals of laser beams that are output from the plurality of light-emitting device groups at different light-emission timings in a single scan and reflected by a target object, and outputs the sum of the detection signals to the control circuit 3.

The control circuit 3 measures the distance to the detected target object on the basis of the time from when a timing signal for driving the light source 11 is output until when a detection signal is obtained, that is, the difference between the time when a laser beam is emitted and the time when reflected light is received.

With this configuration, the quality of laser beams output from the light-emitting device groups is guaranteed, and the angular resolution is kept high. A plurality of laser beams are emitted to the same detection region at different timings, so that the overall intensity and the measurement distance can be increased. Detection signals based on reflected light are added up, so that the detection signals can be obtained with a high signal-to-noise (S/N) ratio and a distance can be measured with high accuracy.

The control circuit 3 may be implemented as an integrated circuit chip, such as a large-scale integration (LSI) chip or a microprocessor, a logic device, such as a field-programmable gate array (FPGA), a combination of an integrated circuit chip and a logic device, etc.

Configuration and Operations of Light Emitter

Figure 2A:
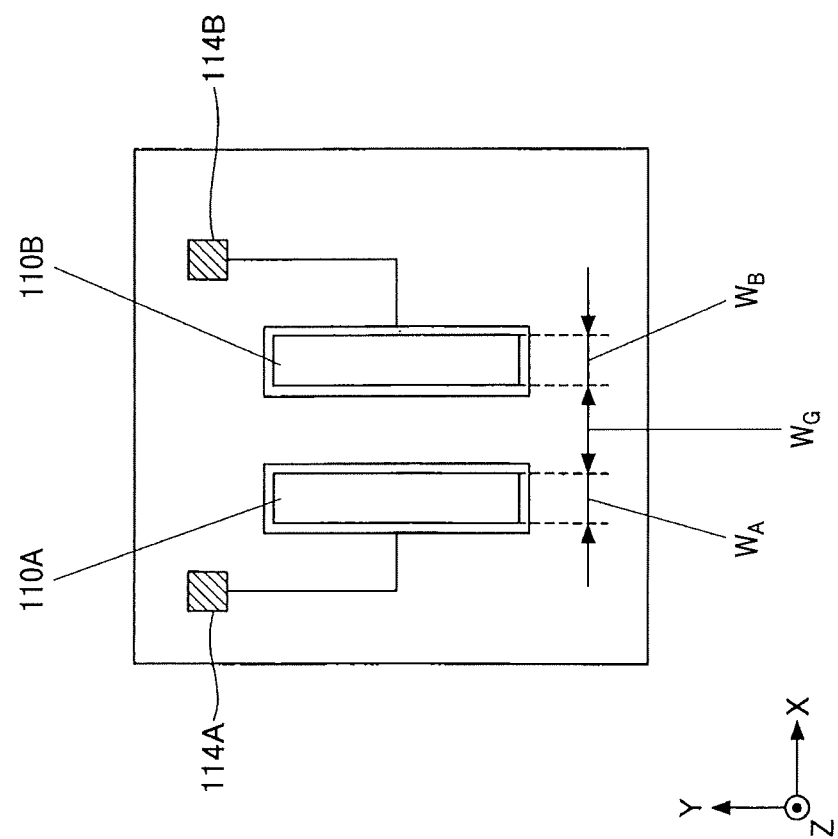
FIGS. 2A and 2B illustrate a configuration of a light source used in a LiDAR apparatus, according to an embodiment of the present disclosure.
Figure 2B:
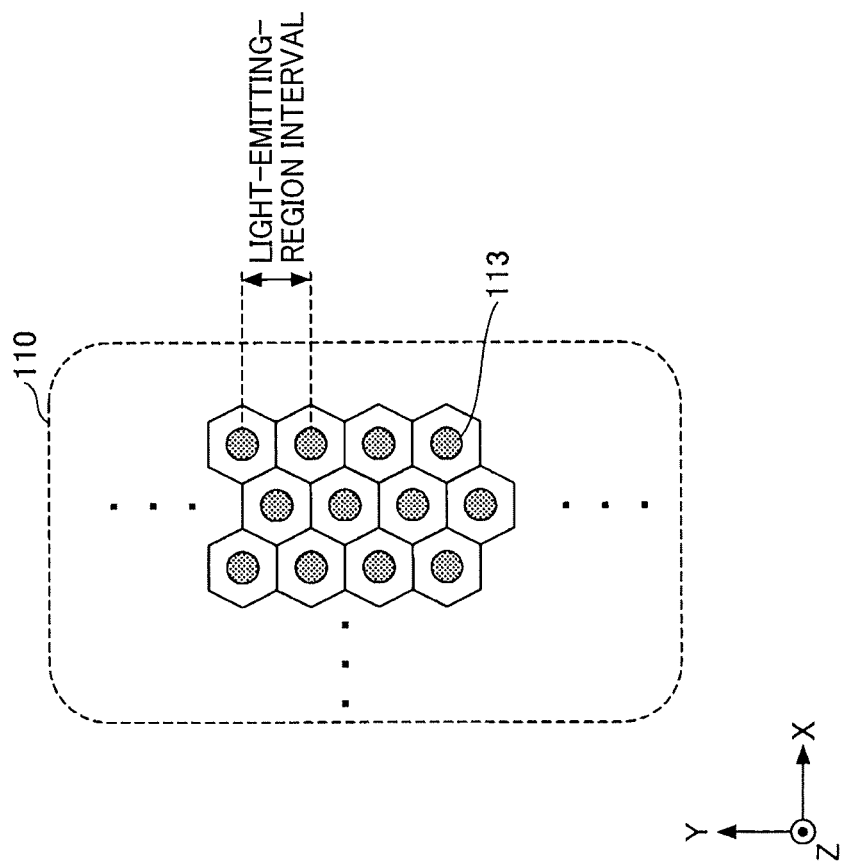

FIGS. 2A and 2B illustrate a configuration of a light source 11A of the LiDAR apparatus 100, according to the present embodiment.

The light source 11A includes a plurality of light-emitting device groups 110 that are arranged in a predetermined direction. In FIG. 2A, a light-emitting device group 110A and a light-emitting device group 110B (referred to as a light-emitting device group A and a light-emitting device group B in FIG. 2A, etc.) are disposed in the X direction with a predetermined gap $W_G$ therebetween. The light-emitting device group 110A and the light-emitting device group 110B are respectively connected to corresponding electrodes 114A and 114B. To the electrode 114A and the electrode 114B, driving signals are applied at timings that are controlled by the control circuit 3 independently of each other, and the light-emitting device group 110A and the light-emitting device group 110B emit light at respective independent timings.

The light-emitting device group 110A has a light-emission width $W_A$ in the X direction, and the light-emitting device group 110B has a light-emission width $W_B$ in the X direction. As described below, the light-emission width W of each of the light-emitting device groups 110 is correlated with the angular resolution of scan beams. The output axis (optical axis) of the light-emitting device group 110A and that of the light-emitting device group 110B extend in the Z direction.

FIG. 2B is a diagram illustrating the in-plane configuration of one light-emitting device group 110. The light-emitting device group 110 includes a plurality of light-emitting devices 113 of a surface-emitting type that are disposed within the XY plane. Each of the light-emitting devices 113 has an opening (that is, a light-emitting region) of a very small size and outputs a laser beam in the Z direction in an isotropic manner.

As the area of the light-emitting region of each light-emitting device 113 is made larger, the amount of light per light-emitting region increases; however, if the light-emitting region is excessively made larger, a plurality of oscillation modes are excited, resulting in a decrease in beam quality. Accordingly, the opening area of each light-emitting device 113 is limited to a range within which the emitted-beam profile does not significantly deviate from an ideal Gaussian function shape.

As the light-emitting regions are disposed closer to each other, the emission intensity per unit area increases; however, if the disposition density is excessively increased, the temperature of the light source 11A rises due to the heat of the light-emitting regions, and high-power light emission becomes difficult. Accordingly, the light-emitting devices 113 are disposed close to each other to the extent that the emission intensity does not decrease. In FIG. 2B, the plurality of light-emitting devices 113 are arranged close to each other in a hexagonal array; however, the arrangement is not limited to this example, and an appropriate arrangement configuration, such as a grid-like arrangement, can be employed. The outer diameter of the light-emitting region of each light-emitting device 113 and the light-emitting-region interval are set within a range of, for example, several micrometers to several hundred micrometers.

Figure 3:
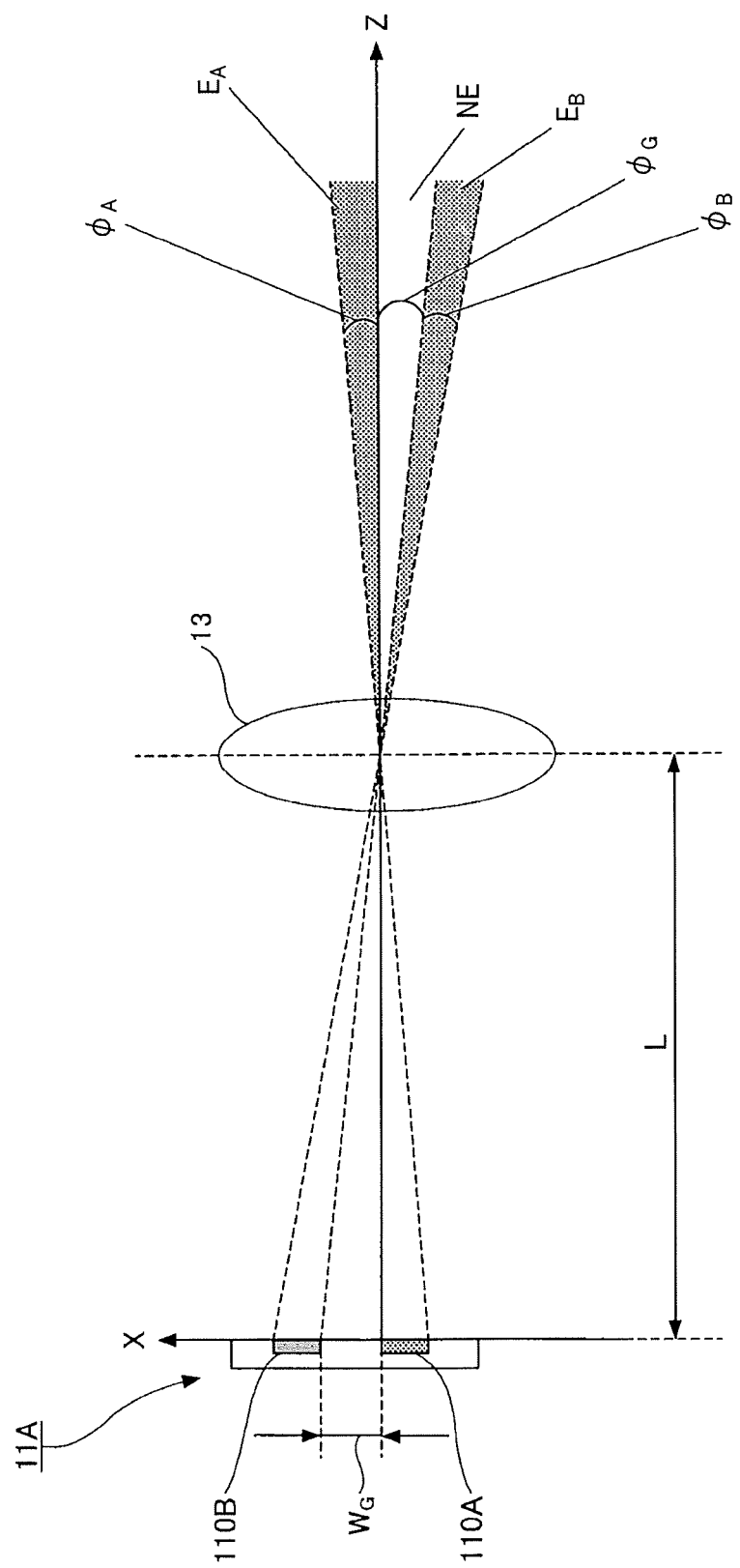
FIG. 3 is a diagram illustrating regions irradiated by a light source according to an embodiment of the present disclosure.

FIG. 3 is a diagram illustrating regions irradiated by the light source 11A, according to the present embodiment.

Light output from each of the light-emitting device groups 110A and 110B is converted to light beams having a predetermined angle of divergence by the coupling lens 13. Here, the light-emission width of the light-emitting device group 110A and that of the light-emitting device group 1100B in the arrangement direction (X-axis direction) are represented by $W_A$ and $W_B$ respectively, and the focal length of the coupling lens 13 is represented by L. The arrangement direction in which the light-emitting device groups 110 are arranged is the scan direction in which laser beams are scanned.

In a case where the coupling lens 13 is disposed apart from the light source 11A by L in the Z direction, the light-irradiation angle range $\Phi_A$ of a region irradiated by the light-emitting device group 110A and the light-irradiation angle range $\Phi_B$ of a region irradiated by the light-emitting device group 11B are respectively expressed in the first and second equations given below.

$$\Phi_A = \tan^{-1}(W_A/L) \cong W_A/L \qquad \text{First Equation}$$

$$\Phi_B = \tan^{-1}(W_B/L) \cong W_B/L \qquad \text{Second Equation}$$

The light-emitting device group 110A and the light-emitting device group 110B are disposed apart from each other, and therefore, a non-irradiated region NE in which light is not present exists between a light-irradiated region $E_A$ irradiated by the light-emitting device group 110A and a light-irradiated region $E_B$ irradiated by the light-emitting device group 110B. When the gap between the adjacent light-emitting device groups is represented by $W_G$, a non-irradiation angle range $\Phi_G$ is expressed in the third equation given below.

$$\Phi_G = \tan^{-1}(W_G/L) \cong W_G/L \qquad \text{Third Equation}$$

For the plurality of light-emitting device groups 110 used in the light source 11A, the light-irradiation angle ranges of the respective light-irradiated regions E and the non-irradiation angle range $\Phi_G$ of the non-irradiated region NE that is not irradiated with light can be determined in advance on the basis of the light-emission widths W in the arrangement direction, the gap $W_G$ in the arrangement, and the focal length L of the coupling lens 13.

As the emission intensity of the light source 11A increases, the intensity of reflected light from a distant detection target also increases, and the detection distance can be increased. Therefore, when the total area of the openings (or the light-emitting regions) of the light-emitting devices 113 illustrated in FIG. 2B is increased, the detection distance can be increased. The light-irradiation angles (define the detection angle resolution of the LiDAR apparatus 100. In general, it is desirable to make the light-irradiation angles (smaller. That is, it is desirable that the light-emission widths W of the respective light-emitting device groups 110 be narrower and the number of the light-emitting devices 113 disposed in the optical scan direction be smaller. In view of these, it is desirable to dispose each of the light-emitting device groups 110 in a shape having a rectangular profile in which the length in a direction (Y direction) orthogonal to the optical scan direction (X direction) is longer.

Figure 4A:
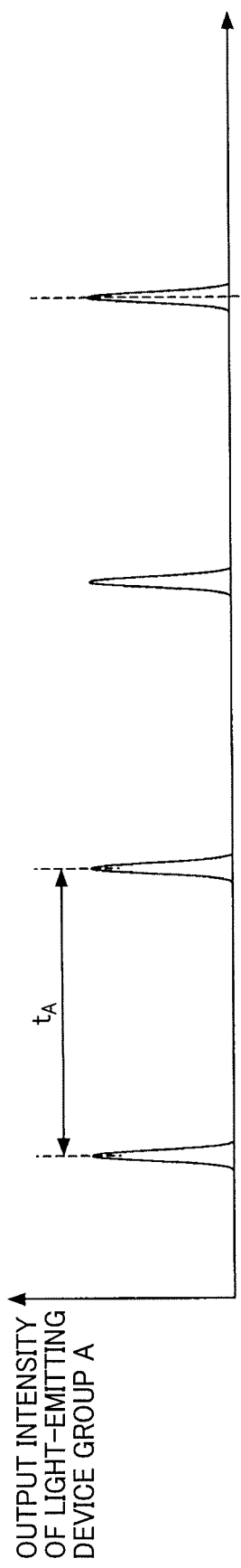
FIGS. 4A and 4B include graphs illustrating pulsed light-emission timings of the light source illustrated in FIGS. 2A and 2B.
Figure 4B:
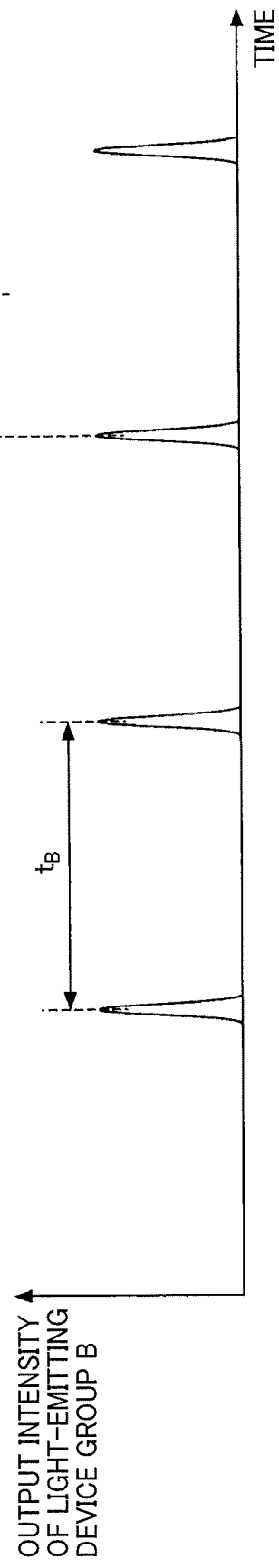

FIGS. 4A and 4B include graphs illustrating pulsed light-emission timings of the light source 11A according to the present embodiment.

The light-emitting device group 110A and the light-emitting device group 110B are made to perform pulsed light emission at predetermined light-emission intervals $t_A$ and $t_B$ respectively, and are characterized in that the light-emission timings of the light-emitting device groups are shifted from each other by a time difference.

The light-emission interval $t_A$ of the light-emitting device group 110A and the light-emission interval $t_B$ of the light-emitting device group 110B are determined on the basis of the scan cycle of the optical scanner 14 and the number of measured resolvable spots of the LiDAR apparatus 100. The number of measured resolvable spots is given as a value obtained by dividing a detection angle range over which measurement is performed by the LiDAR apparatus 100 by the light-irradiation angle (of light beams given by the first or second equation. For example, in a case where the detection angle range of the LiDAR apparatus 100 is 150° in total and the light-irradiation angle of light beams is 0.1°, the number of measured resolvable spots is 1500.

When the time taken for one cycle of a scan performed by the optical scanner 14 is represented by Tr and the detection angle range of the LiDAR apparatus 100 is represented by $\theta_S$, the light-emission interval $t_A$ of the light-emitting device group 110A and the light-emission interval $t_B$ of the light-emitting device group 110B are expressed in the fourth equations (A) and (B), respectively, given below.

$$t_A = Tr \times (\Phi_A/\theta_S) = Tr \times (W_A/L) \qquad \text{Fourth Equation (A)}$$

$$t_B = Tr \times (\Phi_B/\theta_S) = Tr \times (W_B/L) \qquad \text{Fourth Equation (B)}$$

Here, when the light-emission timing of the light-emitting device group 110A and the light-emission timing of the light-emitting device group 110B are shifted from each other by a predetermined time difference $\Delta T_{AB}$, the light-irradiated region $E_A$ irradiated by the light-emitting device group 110A and the light-irradiated region $E_B$ irradiated by the light-emitting device group 110B can spatially match. An elapsed time $t_G$ taken for the optical scanner 14 to scan beams over the non-irradiated region NE (or the non-irradiation angle $F_G$) in FIG. 3 is expressed in the fifth equation given below.

$$t_G = Tr \times (\Phi_G/\theta_S) = Tr \times (W_G/L) \qquad \text{Fifth Equation}$$

In a case where the light-emission width $W_A$ of the light-emitting device group 110A in the X direction and the light-emission width $W_B$ of the light-emitting device group 110B in the X direction are equal to each other ($W_A = W_B = W_X$), a time difference $\Delta T_X$ for the light-emitting device groups 110A and 110B to irradiate the same region is expressed in the sixth equation given below.

$$\Delta T_X = k \cdot t_A + t_G = Tr \times (k \cdot W_X + W_G)/L \qquad \text{Sixth Equation}$$

In this equation, k denotes any integer)

When the light-emission timings for the light pulses are shifted from each other by the time difference so that the plurality of light-emitting device groups 110 irradiate the same region, both the angular resolution and the detection distance can be increased. To increase the detection distance of a LiDAR apparatus, the emission intensity needs to be increased; however, in a light-emitting device array configured according to the related art, to increase the emission intensity, the area of the light-emitting device array (or the number of light-emitting devices arranged in an array) also increases. Accordingly, the irradiation angle range of laser beams output from the light-emitting device array becomes wider, resulting in a decrease in the angular resolution. On the other hand, in the LiDAR apparatus 100 according to this embodiment, the same region is scanned with laser beams from the plurality of light-emitting device groups a plurality of times without an increase in the light-emission area of each of the light-emitting device groups. Specifically, the angular resolution in the scan direction is kept high without an increase in the light-emission widths W of the light-emitting device groups in the scan direction, and the effective light irradiation intensity can be increased.

In the example described above, the case where the number of the light-emitting device groups 110 is two has been described for simplified description. As the number of the light-emitting device groups 110 increases, the present invention becomes more effective. When the number of the light-emitting device groups 110 arranged in the scan direction (X direction) is represented by N, the ratio between a detected light component and a noise light component (S/N ratio) can be $\sqrt{N}$ times as high as that in a case of using a single light-emitting device group having the same area. As the S/N ratio increases, the detectable distance increases.

For the LiDAR apparatus 100 according to this embodiment, the maximum number of the light-emitting device groups 110 can be approximated as follows. When the maximum detectable distance is represented by ZMAX and the speed of light is represented by c, the time difference $\Delta t\text{MAX}$ between the light-emission timing at which a laser beam is emitted and the reception timing at which reflected light from a detection target object is received is expressed in the seventh equation given below.

$$\Delta t\text{MAX} = 2 \times \text{ZMAX}/c \qquad \text{Seventh Equation}$$

This time difference $\Delta t\text{MAX}$ is the minimum value of a pulse interval at which each of the light-emitting device groups 110 can emit light.

The light-emission interval $t_X$ of the light-emitting device group 110X is expressed in the eighth equation given below based on the fourth equation (A) or (B).

$$t_X = Tr \times (\Phi_X/\theta_S) \qquad \text{Eighth Equation}$$

Here, Tr represents the time taken for one cycle of a scan performed by the optical scanner 14, $\theta_S$ represents the detection angle range of the LiDAR apparatus 100, and $\Phi_X$ represents the angle of divergence of a region irradiated by the light-emitting device group 110X. In general, $t_X$ is a value larger than $\Delta t\text{MAX}$, and pulsed light emitted from the plurality of light-emitting device groups 110 can be multiplexed within the period of $t_X$. The maximum number M of the light-emitting device groups that can be multiplexed is expressed in the ninth equation given below based on the seventh equation and the eighth equation.

$$M = t_X/\Delta t\text{MAX} = Tr \cdot \Phi_X \cdot c/(2\theta_S \cdot \text{ZMAX}) \qquad \text{Ninth Equation}$$

For example, in a case of Tr=100 ms, $\Phi_X$=0.1°, $\theta_S$=150°, and ZMAX=200 m, M is equal to 50, and at maximum 50 light-emitting device groups can be disposed side by side in the optical scan direction so as to be spaced apart from each other. When the light-emission timings of the respective light-emitting device groups are made different, the 50 light-emitting device groups can irradiate the same detection region. In this case, the S/N ratio of a detection signal can be $\sqrt{50}$ times (approximately seven times) as high as that in a case of detection using a single large light-emitting device group.

As described above, in this embodiment, the same region is detected a plurality of times with the plurality of light-emitting device groups without an increase in the light-emission area of each light-emitting device group segment. Therefore, the substantial light irradiation intensity can be increased without causing degradation in the emitted-beam profile. Accordingly, the detectable measurement distance can be increased while the detection angle resolution in the optical scan direction is kept in a good condition.

In the above description, the maximum number M of the light-emitting device groups is estimated from the limitation on the pulsed light-emission intervals. A desirable arrangement when the plurality of light-emitting device groups are integrated onto the same substrate is determined from the number of light-emitting devices.

Referring back to the case where the number of the light-emitting device groups is two (the configuration illustrated in FIG. 2A), a description is given. In the case where the width $W_A$ of the light-emitting device group 110A in the X direction and the width $W_B$ of the light-emitting device group 110B in the X direction are equal to each other, when the light-emission width of each of the light-emitting device groups 110A and 110B is represented by $W_X$, the light-emission interval (or pulse interval) $t_X$ is expressed in the tenth equation given below based on the fourth equations (A) and (B).

$$t_X = Tr \times (W_X/L) \qquad \text{Tenth Equation}$$

The time difference $\Delta t_X$ for each of the two light-emitting device groups to irradiate the same region is expressed in the sixth equation given below.

$$\Delta t_X = Tr \times (k \cdot W_X + W_G)/L \qquad \text{Sixth Equation}$$

As illustrated in FIGS. 4A and 4B, in a case where the light-emission timings of the two light-emitting device groups are shifted by the half cycle of the respective light-emission intervals to emit light, emitted pulses of each of the light-emitting device groups are least likely to become stray light components for the other. In this case, $t_X = 2\Delta t_X$ is satisfied, and therefore, the eleventh equations given below hold from the sixth equation and the tenth equation.

$$Tr \times (W_X/L) = 2 \times Tr \times (k \cdot W_X + W_G)/L$$

$$2W_G = k' \cdot W_X \qquad \text{Eleventh Equation}$$

As the gap $W_G$ is decreased, the light sources can be integrated with higher density, and the minimum value of $W_G$ is given by the twelfth equation given below while k'=1 is set in the eleventh equation.

$$W_G = W_X/2$$

In a case where the number of the light-emitting device groups 110 that are disposed side by side in the optical scan direction increases, the same idea is also applicable. In a case where N light-emitting device groups 110 having the same light-emission width W are disposed side by side, the gap $W_G$ between adjacent light-emitting device groups 110 is set as follows relative to the light-emission width $W_X$ of each of the light-emitting device groups 110.

$$W_G = W_X/N \qquad \text{Thirteenth Equation}$$

Then, the pulsed light-emission intervals of the respective light-emitting device groups 110 are dispersed to the largest degree. Accordingly, the possibility that the emitted pulses of each of the light-emitting device groups 110 become stray light for the other light-emitting device group at the time of detection can be reduced.

Each of the light-emitting device groups 110 is formed of a plurality of VCSELs that are disposed close to each other, and therefore, it is difficult to precisely define the gap $W_G$ between the light-emitting device groups 110 as expressed in the thirteenth equation; however, it is desirable to define the average gap between the adjacent light-emitting device groups 110 so as to satisfy the thirteenth equation.

Figure 5:
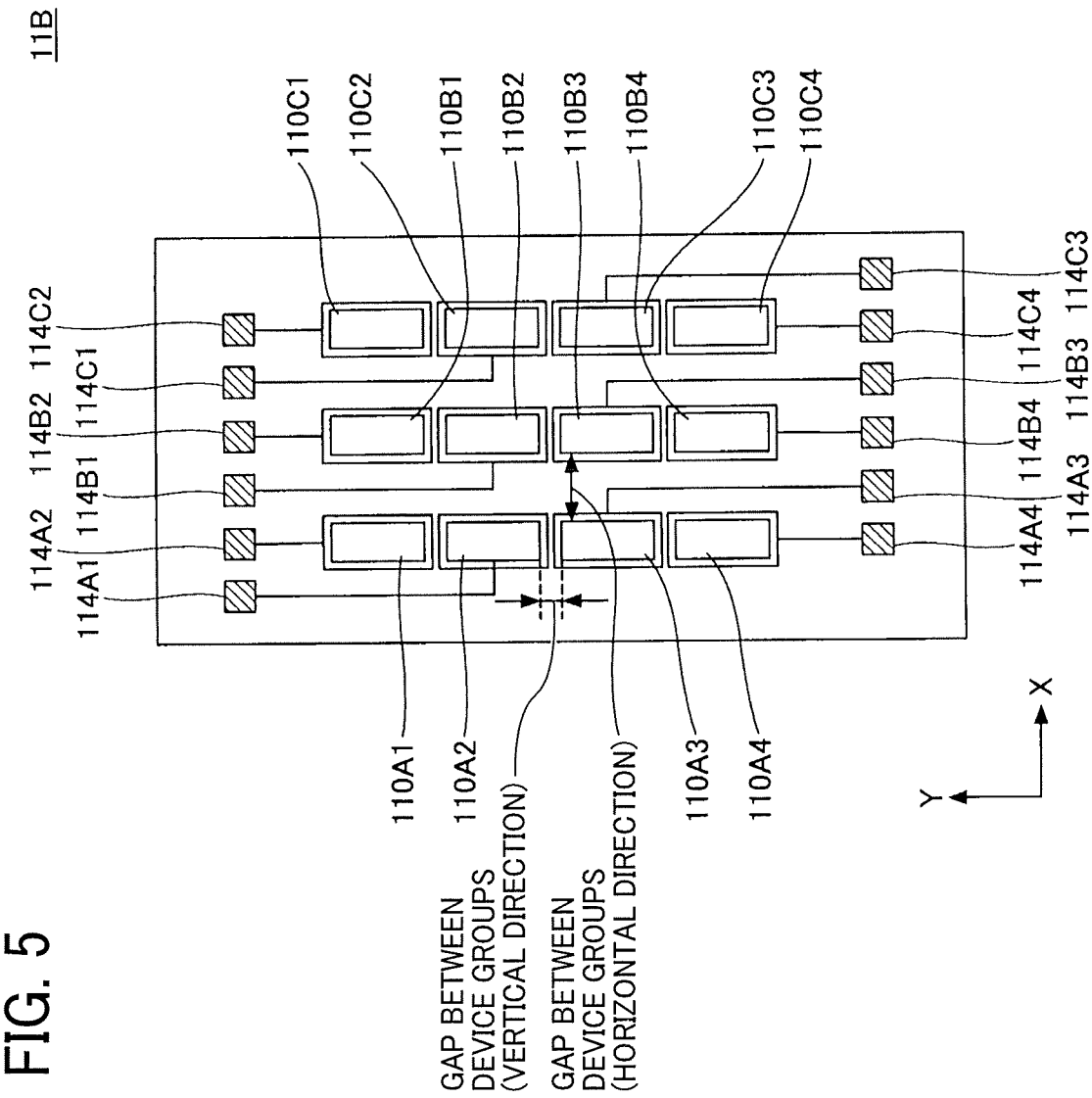
FIG. 5 is a diagram illustrating a configuration of a light source according to an alternative embodiment of the present disclosure.

FIG. 5 illustrates an example configuration of a light source 11B used in the LiDAR apparatus 100, according to the present embodiment.

The configuration in which the plurality of light-emitting device groups 110 are disposed side by side in the optical scan direction (X direction) so as to be spaced apart from each other has been described with reference to FIG. 2A to FIG. 4B; however, the plurality of light-emitting device groups 110 may be disposed in the X direction and the Y direction so as to be spaced apart from each other, as illustrated in FIG. 5. When the light-emitting device groups 110 are thus disposed in two dimensions, the light-emission timings of the light-emitting device groups 110 spaced apart from each other in a direction orthogonal to the optical scan direction are made different, and a distance is measured with emitted pulses from the respective light-emitting device groups 110, the number of detection layers in the vertical direction can be increased.

In FIG. 5, twelve light-emitting device groups 110 (110A1, 110A2, . . . , etc.) are disposed in a 3×4 matrix, electrodes 114 (114A1, 114A2, . . . , etc.) are connected to the respective light-emitting device groups 110, and control signals for controlling the light-emission timings are applied. When the light-emitting device groups 110 are disposed in the vertical direction (Y direction) so as to be spaced apart from each other and made to emit light independently of each other, a polygon mirror having reflection surfaces each inclined at the same angle relative to the others or a MEMS scanner that can perform a mirror scan in a uniaxial direction can be used as the optical scanner 14. When the example configuration of the light source in this embodiment is combined, the number of detection layers in the vertical direction can be increased.

To suppress a detection error caused by the layers spaced apart from each other in the vertical direction, it is desirable to make the separation distance between the light-emitting device groups 110 in the vertical direction smaller to the extent possible. Therefore, it is desirable to make the separation distance in the Y direction orthogonal to the optical scan direction shorter than the separation distance in the optical scan direction (X direction), as illustrated in FIG. 5. When the distance between the light-emitting device groups adjacent to each other in the optical scan direction is made relatively longer, a wiring line for applying a driving current for laser oscillation to each of the light-emitting device groups 110 can be easily laid in the separation region.

In the configurations illustrated in FIG. 2A and FIG. 5, all of the light-emitting device groups 110 arranged in the optical scan direction may be formed of the same VCSELs. In a case where wavelength filters are combined with the light-receiving device as described below, the output wavelengths of the light-emitting device groups 110 disposed side by side in the optical scan direction may be made different from each other. In this case, even if the light-emission timings of the plurality of light-emitting device groups 110 are close to each other, crosstalk between the light-emitting device groups 110 can be reduced, and the accuracy of distance measurement can be increased.

Figure 6:
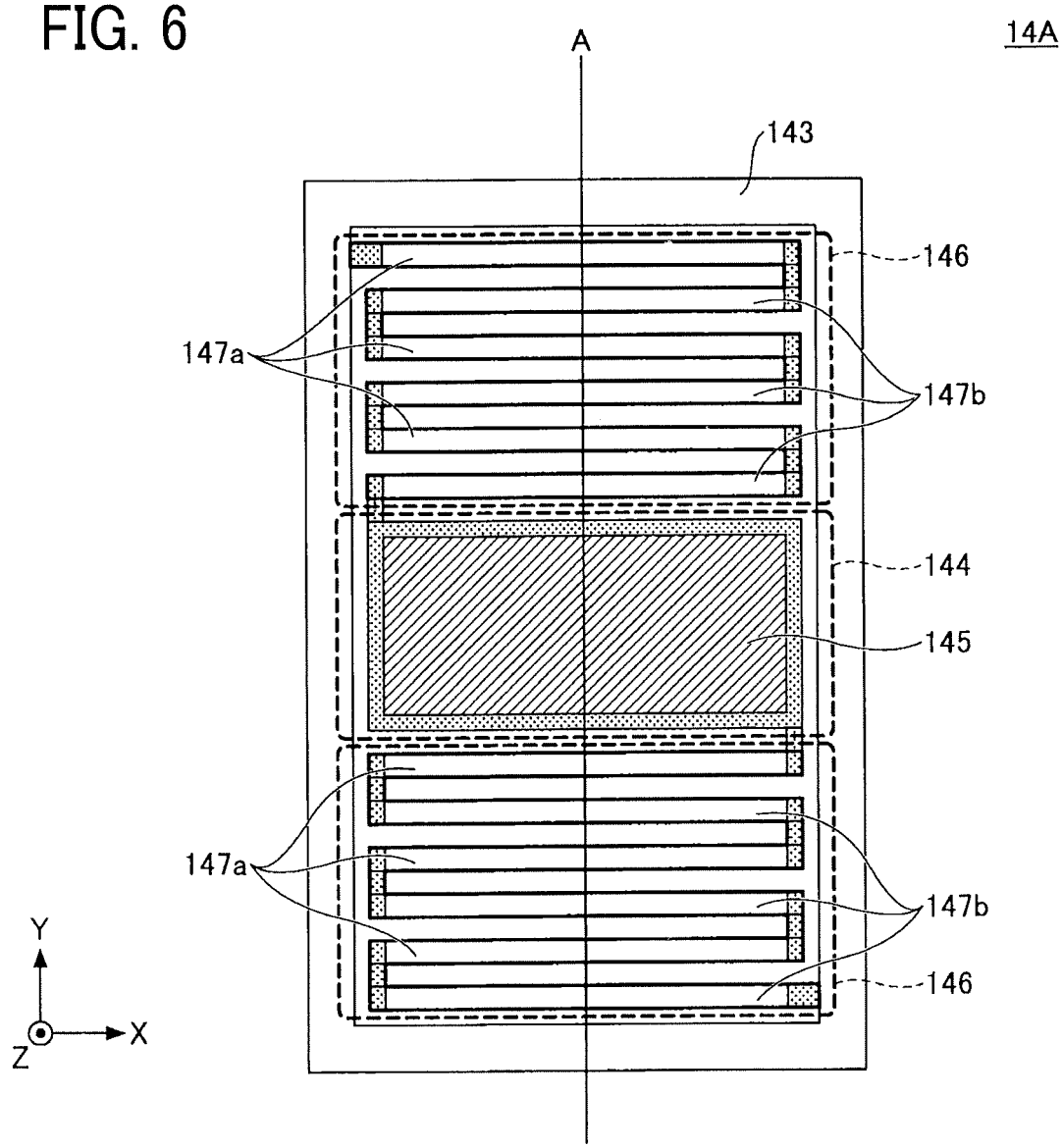
FIG. 6 illustrates a configuration of a Micro-Electro-Mechanical Systems (MEMS) mirror used as an optical scanner, according to an embodiment of the present disclosure.

FIG. 6 illustrates a MEMS scanner 14A, which is used as the optical scanner 14 according to the present embodiment.

The MEMS scanner 14A includes a movable part 144 that includes a reflecting mirror 145, and a pair of meander beam parts 146 that support the movable part 144 on the respective sides of the movable part 144. Each of the meander beam parts 146 has one end that is fixed to a supporting substrate 143 and the other end that is coupled to the movable part 144.

In each of the meander beam parts 146, first piezoelectric members 147a and second piezoelectric members 147b are alternately disposed via a plurality of folding parts to form a meander pattern. To the first piezoelectric member 147a and the second piezoelectric member 147b adjacent to each other, voltage signals having phases opposite to each other are applied, and each of the meander beam parts 146 warps in the Z direction.

The first piezoelectric member 147a and the second piezoelectric member 147b adjacent to each other warp in the opposite directions. The warps in the opposite directions are accumulated, and the movable part 144 including the reflecting mirror 145 rotates about the rotation axis A in a reciprocating manner.

When a sine wave having a driving frequency that matches a mirror resonance mode in which the rotation axis A is the rotation center is applied to the first piezoelectric members 147a and the second piezoelectric members 147b in opposite phases, a large rotation angle can be obtained at a low voltage.

The MEMS scanner 14A performs an optical scan in a uniaxial direction (X direction). In detection and measurement in the vertical direction (Y direction), light emission by the plurality of light-emitting device groups 110 disposed in the Y direction so as to be spaced apart from each other is switched, so that the number of layers can be increased.

Figure 7:
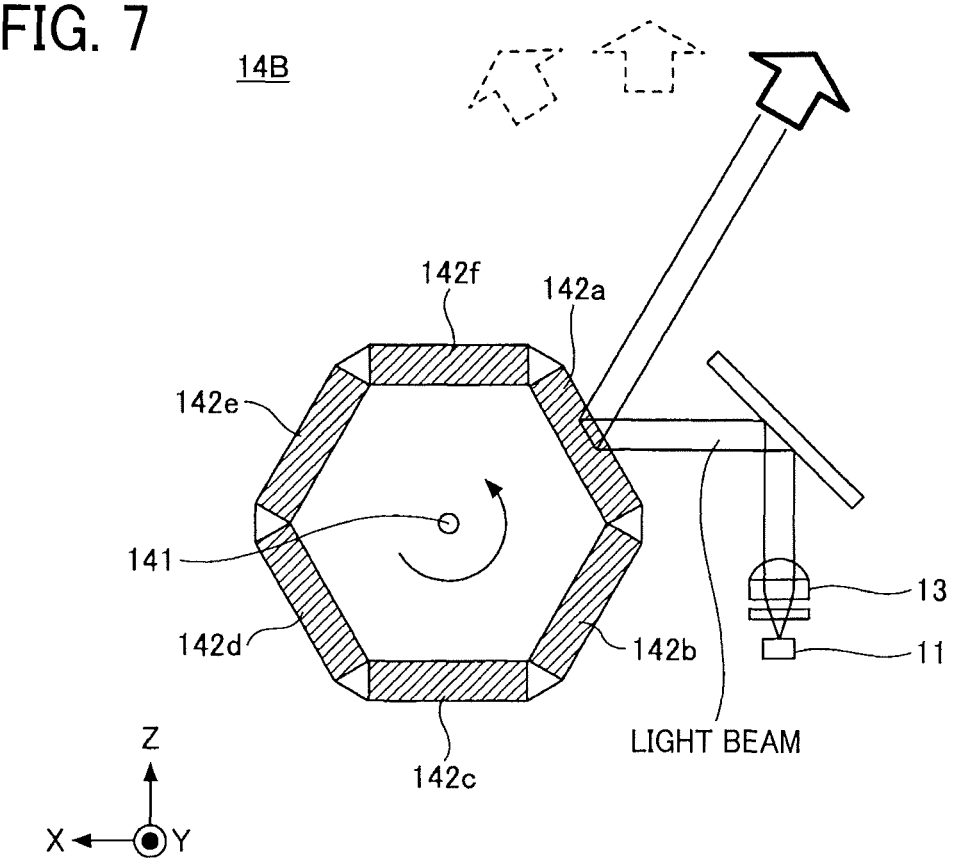
FIG. 7 illustrates a configuration of a polygon mirror used as an optical scanner, according to an embodiment of the present disclosure.

FIG. 7 illustrates a polygon mirror 14B, which is another example of the optical scanner 14 according to the present embodiment.

The polygon mirror 14B rotates about a rotation axis 141 at a constant speed. In this example, flat mirrors 142a to 142f are provided on the six inclined surfaces of a hexagonal rotating body. The flat mirrors 142a to 142f are inclined at the same angle relative to the rotation axis 141. When the rotating body rotates about the rotation axis 141, the angle at which a laser beam is incident on the mirror surface changes, and the laser beam can be scanned within the XZ plane. In detection and measurement in the vertical direction (Y direction), light emission by the plurality of light-emitting device groups 110 disposed in the Y direction so as to be spaced apart from each other is switched, so that the number of layers can be increased.

Configuration and Operations of Light Receiver

Figure 8:
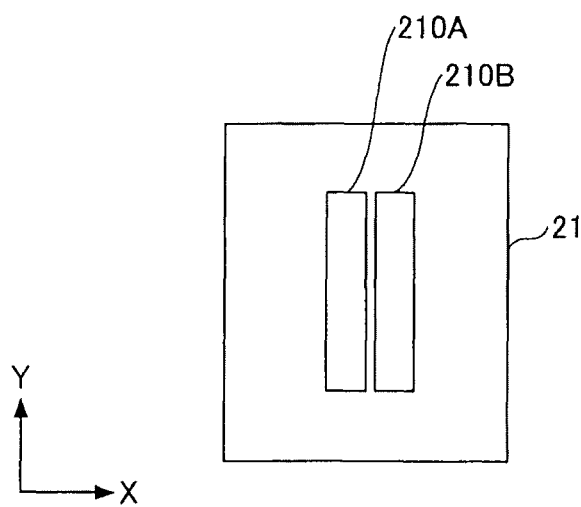
FIG. 8 is a schematic diagram of a light-receiving device according to an embodiment of the present disclosure.

FIG. 8 is a schematic diagram of the light-receiving device 21 according to the present embodiment.

In the LiDAR apparatus 100 according to this embodiment, it is assumed that reflected pulsed light from a detection target is detected by one light-receiving device, namely, the light-receiving device 21; however, the one light-receiving device 21 may be formed of a plurality of light-receiving segments, namely, light-receiving segments 210A and 210B (hereinafter sometimes collectively referred to as light-receiving segments 210, and referred to as light-receiving segments A and B in FIG. 8), that are disposed close to each other.

The light-receiving segments 210A and 210B have a predetermined light-receiving width in the optical scan direction (X direction) and are disposed adjacent to each other to correspond to the disposed light-emitting device groups 110A and 110B.

Figure 9:
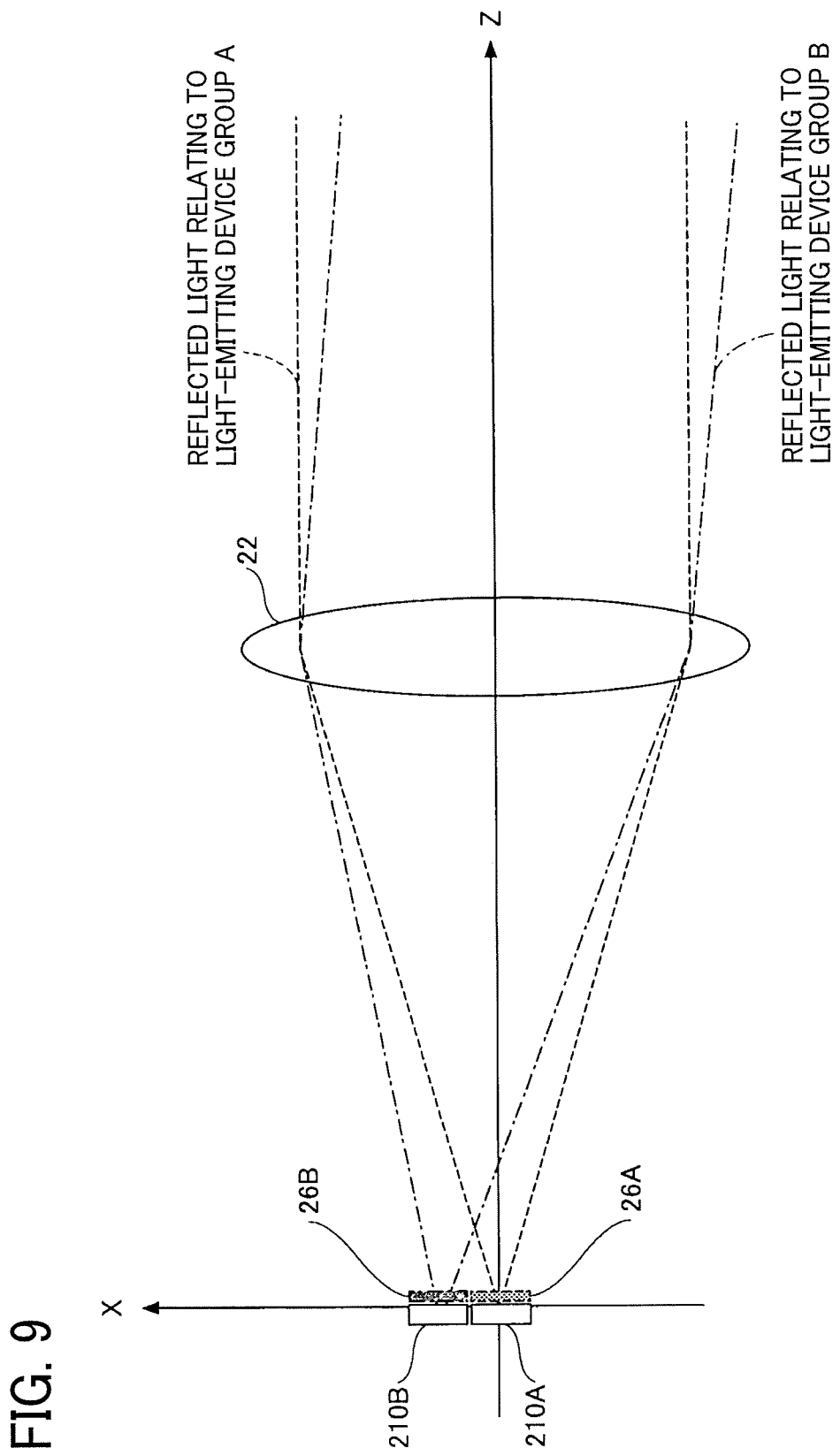
FIG. 9 is a diagram illustrating a light detection angle range obtained by the light-receiving device illustrated in FIG. 8.

FIG. 9 is a diagram illustrating a light detection angle range obtained by the light-receiving device 21 illustrated in FIG. 8.

When the gap between the light-receiving segments 210 is narrowed, the detection ranges obtained by the light-receiving segment 210A and the light-receiving segment 210B disposed closed to each other can be substantially the same detection region, though there may be a difference comparable to a tolerance. In FIG. 9, wavelength filters 26A and 26B (hereinafter sometimes collectively referred to as wavelength filters 26, and referred to as wavelength filters A and B in FIG. 10) having different passing-wavelength characteristics are disposed on the light-receiving segments 210A and 210B respectively.

Reflected light from a target object is received through the light-receiving lens 22. The light-emitting device groups 110A and 110B emit light at respective different light-emission timings, and the output laser beams are scanned over the same detection region; however, the laser beams are incident on the light-receiving lens 22 at angles that are slightly different due to the gap $W_G$ between the light-emitting device groups 110.

Light output from the light-emitting device group 110A and reflected by a target object is condensed onto the light-receiving device 21 by the light-receiving lens 22, passes through the wavelength filter 26A, and is received by the light-receiving segment 210A. Light output from the light-emitting device group 110B and reflected by a target object is condensed onto the light-receiving device 21 by the light-receiving lens 22, passes through the wavelength filter 26B, and is received by the light-receiving segment 210B.

With the configuration illustrated in FIG. 9, even in a case where the light-emission timings of the plurality of light-emitting device groups 110 are close to each other, distance measurement results obtained with laser beams output from the respective light-emitting device groups 110 can be more precisely separated.

Figure 10:
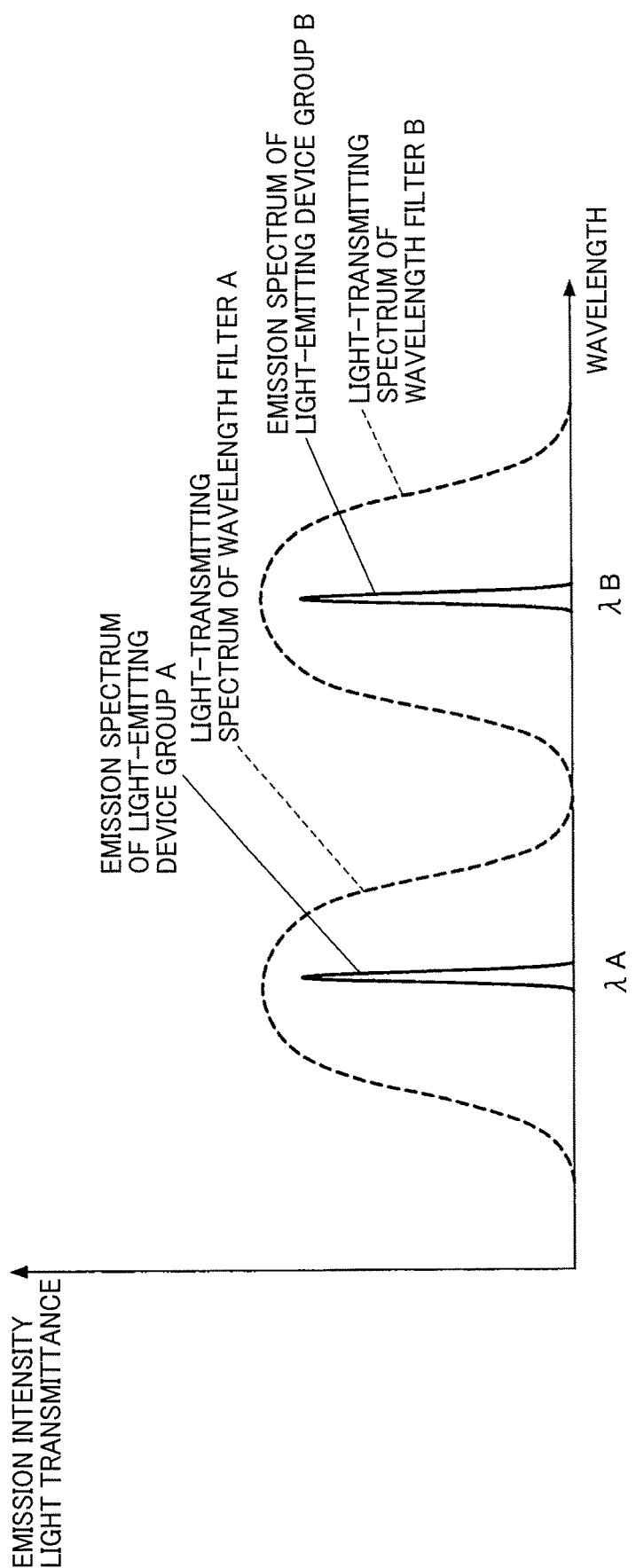
FIG. 10 is a graph illustrating the emission spectra of two light-emitting device groups and the passing-wavelength characteristics of corresponding wavelength filters, according to an embodiment of the present disclosure.

FIG. 10 is a graph illustrating the emission spectra of the light-emitting device groups 110A and 110B and the passing-wavelength characteristics of the wavelength filters 26A and 26B, according to the present embodiment.

The oscillation wavelengths of the plurality of VCSELs included in the same light-emitting device group 110 are made substantially equal to each other, and the oscillation wavelengths of the plurality of VCSELs included in each of the light-emitting device groups 110 are made different from the oscillation wavelengths of the plurality of VCSELs included in the other light-emitting device group 110. On the light-receiving side, the wavelength filters 26 each having a passband that is included only in a corresponding oscillation wavelength band are provided in the light-receiving device 21, and light output from each of the light-emitting device groups 110 and reflected by a target object is received. The transmission characteristics of the respective light-receiving segments 210 of the light-receiving device 21 are made different from each other so as to correspond to the plurality of light-emitting device groups 110, so that even in the case where the light-emission timings of the plurality of light-emitting device groups 110 are close to each other, crosstalk between the light-emitting device groups 110 can be reduced, and the accuracy of distance measurement can be increased.

In place of the wavelength filters 26, a diffractive device having a diffraction angle that differs from wavelength to wavelength may be disposed on the light-receiving segments 210 as wavelength selection devices. Alternatively, in place of the wavelength filters 26, polarizing filters that allow light beams in respective different polarization directions to pass therethrough may be disposed on the light-receiving device 21. In this case, the polarization directions of light beams emitted from the respective two light-emitting device groups 110 may be made different from each other. For example, when light output from one of the two light-emitting device groups 110 is made to pass through a predetermined wave plate, the polarization directions can be made different from each other between the two light-emitting device groups 110. Alternatively, the light-emitting regions of the VCSELs that constitute the light-emitting device groups 110 may be formed so as to have an oval shape, and the orientations of the major axis and the minor axis may be made different between the light-emitting device groups 110. With these configurations, detection signals based on laser output from the different light-emitting device groups 110 can be separated from each other. The effective intensity of the light source and the detection distance can be increased while measurement is kept reliable.

The example case where the number of the light-emitting device groups 110 and the number of the light-receiving segments 210 are two has been described with reference to FIG. 8 to FIG. 10; however, the number of the light-receiving segments 210 can be easily increased in accordance with an increase in the number of the light-emitting device groups 110. The laser oscillation wavelengths of the respective light-emitting device groups 110 may be made different from each other by making the resonant frequency of the VCSELs constituting each of the light-emitting device groups 110 different from that of the other light-emitting device group 110. Regarding the wavelength filters 26 provided on the light-receiving device 21, for example, Fabry-Perot wavelength filters having different cavity lengths can be used to form a plurality of wavelength filters having different wavelength bands on the same substrate.

In the configuration in which the plurality of light-emitting device groups 110 are disposed with a predetermined gap therebetween to increase the detection distance while beam quality is maintained, even if the light-emission timings of the light-emitting device groups 110 are close to each other, detection signals based on respective laser beams can be separated from each other. The effective intensity of the light source and the detection distance can be increased while distance measurement is kept reliable.

In a case where the LiDAR apparatus 100 is mounted in a vehicle, such as a car, the LiDAR apparatus 100 is generally disposed in a front upper part of the vehicle; however, the LiDAR apparatus 100 may be disposed on the side or in a rear part of the vehicle. The LiDAR apparatus 100 is applicable not only to a vehicle but also to an air vehicle, such as an aircraft or a drone, an autonomous mobile body, such as a robot, and any other mobile bodies. The configuration of the light source 11 according to this embodiment can be employed to maintain a high angular resolution and increase the detection distance.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A distance measuring apparatus comprising:
a light source configured to emit light beams;
an optical scanner configured to scan the light beams output from the light source over a predetermined range;
a light receiver configured to receive reflected light obtained as a result of the light beams being reflected by a target object, and to output detection signals; and
a control circuit configured to measure a distance to the target object based on the detection signals,
the light source including a plurality of light-emitting device groups that are arranged in a scan direction of a scan performed by the optical scanner,
the control circuit being configured to make the plurality of light-emitting device groups emit light at respective different timings in a single scan, and to measure the distance to the target object based on a sum of the detection signals,
wherein the plurality of light-emitting device groups are disposed in the scan direction so as to be spaced apart by a first separation distance, and disposed in a vertical direction orthogonal to the scan direction so as to be spaced apart by a second separation distance, and
wherein the second separation distance is shorter than the first separation distance.

2. The distance measuring apparatus according to claim 1, wherein
the plurality of light-emitting device groups each include a plurality of vertical-cavity surface-emitting lasers that are disposed at predetermined intervals.

3. The distance measuring apparatus according to claim 1, wherein
the plurality of light-emitting device groups are configured to emit light with respective different wavelengths.

4. The distance measuring apparatus according to claim 3, wherein
the light receiver includes a plurality of light-receiving segments that are arranged in the scan direction, and
the plurality of light-receiving segments are provided with wavelength selectors.

5. The distance measuring apparatus according to claim 4, wherein
the wavelength selectors correspond to wavelength filters having respective different passing-wavelength bands or a diffractive device having a diffraction angle that differs from wavelength to wavelength.

6. The distance measuring apparatus according to claim 1, wherein
the light source includes two light-emitting device groups that are arranged in the scan direction,
the two light-emitting device groups are configured to output light in respective different polarization directions,
the light receiver includes two light-receiving segments that are arranged in the scan direction, and
the two light-receiving segments are provided with polarizing filters configured to allow the light in the respective different polarization directions to pass through the polarizing filters.

7. The distance measuring apparatus according to claim 6, wherein
one of the two light-emitting device groups is provided with a predetermined wave plate.

8. A distance measuring apparatus comprising:
a light source configured to emit light beams;
an optical scanner configured to scan the light beams output from the light source over a predetermined range;
a light receiver configured to receive reflected light obtained as a result of the light beams being reflected by a target object, and to output detection signals; and
a control circuit configured to measure a distance to the target object based on the detection signals,
the light source including a plurality of light-emitting device groups that are arranged in a scan direction of a scan performed by the optical scanner,
the control circuit being configured to make the plurality of light-emitting device groups emit light at respective different timings in a single scan, and to measure the distance to the target object based on a sum of the detection signals,
wherein the plurality of light-emitting device groups are disposed in the scan direction so as to be spaced apart by a first separation distance, and
wherein when the number of the plurality of light-emitting device groups is represented by N and a light-emission width of each of the light-emitting device groups in the scan direction is represented by $W_X$, the first separation distance is set to $W_X/N$.

9. A method of measuring distance comprising:
emitting light beams from a light source;
scanning the light beams output from the light source over a predetermined range with an optical scanner;
receiving reflected light obtained as a result of the light beams being reflected by a target object, and outputting detection signals; and
measuring a distance to the target object based on a sum of detection signals,
wherein the light source includes a plurality of light-emitting device groups that are arranged in a scan direction of a scan performed by the optical scanner,
wherein the plurality of light-emitting device groups emit light at respective different timings in a single scan,
wherein the plurality of light-emitting device groups are disposed in the scan direction so as to be spaced apart by a first separation distance, and disposed in a vertical direction orthogonal to the scan direction so as to be spaced apart by a second separation distance, and
wherein the second separation distance is shorter than the first separation distance.

* * * * *